(12) United States Patent
Rothberg (10) Patent No.: US 6,895,500 B1
(45) Date of Patent: May 17, 2005

(54) DISK DRIVE FOR RECEIVING SETUP DATA IN A SELF MONITORING ANALYSIS AND REPORTING TECHNOLOGY (SMART) COMMAND

(75) Inventor: Michael S. Rothberg, Foothill Ranch, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 550 days.

(21) Appl. No.: 10/004,231

(22) Filed: Oct. 31, 2001

(51) Int. Cl.$^7$ ............................................. G11B 27/36
(52) U.S. Cl. ............................ 713/1; 713/2; 713/100; 713/103; 360/31; 360/53
(58) Field of Search ....................... 713/1, 2, 100; 360/31, 53; 711/103

(56) References Cited

U.S. PATENT DOCUMENTS

| | | | | |
|---|---|---|---|---|
| 5,570,398 A | * | 10/1996 | Smith | 375/376 |
| 5,918,068 A | * | 6/1999 | Shafe' | 710/11 |
| 5,930,358 A | | 7/1999 | Rao | |
| 6,336,161 B1 | * | 1/2002 | Watts | 711/103 |
| 6,347,359 B1 | * | 2/2002 | Smith et al. | 711/114 |
| 6,600,614 B2 | * | 7/2003 | Lenny et al. | 360/31 |
| 6,650,492 B2 | * | 11/2003 | Lenny et al. | 360/31 |

FOREIGN PATENT DOCUMENTS

| WO | WO 99/45535 | 9/1999 |
|---|---|---|

* cited by examiner

Primary Examiner—A. Elamin
(74) Attorney, Agent, or Firm—Milad G. Shara, Esq.; Howard H. Sheerlin, Esq.

(57) ABSTRACT

A disk drive is disclosed for receiving a Self Monitoring Analysis and Reporting Technology (SMART) command from a host computer. The disk drive comprises a plurality of configuration parameters stored in a non-volatile manner for configuring at least one system when the disk drive is powered on. The SMART command comprises a command code comprising a predetermined value for identifying the command code as a SMART command and a sub command comprising one of a plurality of predetermine values identifying one of a plurality of SMART commands selected from the group consisting of enabling SMART diagnostics, reading diagnostic data, and transmitting setup data to the disk drive. The SMART command further comprises setup data for modifying the configuration parameters.

28 Claims, 4 Drawing Sheets

FIG. 1

```
BOOL DeviceIoControl(hDevice, dwIoControlCode, lpvInBuffer, cbInBuffer,
                     lpvOutBuffer, lpcBytesReturned, lpoOverlapped)

HANDLE          hDevice;            // hande of device
DWORD           dwIoControlCode;    // control code of operation to perform
LPVOID          lpvInbuffer;        // address of buffer for input data
DWORD           cbInBuffer;         // size of input buffer
LPVOID          lpvOutBuffer;       // address of output buffer
DWORD           cbOutBuffer;        // size of output buffer
LPDWORD         lpcBytesReturned;   // address of actual bytes of output
LPOVERLAPPED    lpoOverlapped;      // address of overlapped structure
```

FIG. 2A

```
typedef struct _SENDCMDINPARAMS {
    DWORD       dwBufferSize    // Size of bBuffer in bytes
    IDEREGS     irDriveRegs;    // Structure with drive register values.
    BYTE        chDriveNumber;  // Physical drive number to send command to (0,1,2,3).
    BYTE        chReserved[3];  // Reserved for future expansion.
    DWORD       dwReserved[4];  // Reserved for future expansion.
    BYTE        chBuffer[1];    // Buffer of arbitrary length in which to store the data to be written to drive.
} SENDCMDINPARAMS, *PSENDCMDINPARAMS, *LPSENDCMDINPARAMS;
```

FIG. 2B

```
typedef struct SendCmdOutParams {
    DWORD           dwBufferSize;   // Size of bBuffer in bytes
    DRIVERSTATUS    DriverStatus;   // Driver status structure.
    BYTE            chBuffer[1];    // Buffer of arbitrary length in which to store the data read from
                                    // the drive.
} SENDCMDOUTPARAMS, *PSENDCMDOUTPARAMS;
```

FIG. 2C

```
typedef struct _IDEREGS {
    BYTE    chFeaturesReg;      // Used for specifying DFP sub commands.
    BYTE    chSectorCountReg;   // IDE sector count register
    BYTE    chSectorNumberReg;  // IDE sector number register
    BYTE    chCylLowReg;        // IDE low order cylinder value
    BYTE    chCylHighReg;       // IDE high order cylinder value
    BYTE    chDriveHeadReg;     // IDE drive/head register
    BYTE    chCommandReg;       // Actual IDE command. Checked for validity by driver.
    BYTE    chReserved;         // reserved for future use. Must be zero.
} IDEREGS, *PIDEREGS;
```

DISK DRIVE FOR RECEIVING SETUP DATA IN A SELF MONITORING ANALYSIS AND REPORTING TECHNOLOGY (SMART) COMMAND

BACKGROUND OF THE INVENTION

1. Field of the Invention

The present invention relates to disk drives. More particularly, the present invention relates to a disk drive for receiving setup data in a self monitoring analysis and reporting technology (SMART) command.

2. Description of the Prior Art

Conventional disk drives comprise a sector of configuration parameters used to configure the operating mode when powered on. The configuration parameters are used to configure, for example, the read/write channel, the cache system, and the error recovery system. The configuration parameters are generally inaccessible from a host computer due to the limitations of its operating system, such as a Microsoft Windows operating system and associated drivers.

A utility has been disclosed for configuring a write-verify error recovery operation from the host computer. However, this utility can only be executed after the host computer is "clean" booted from a floppy disk so that the Microsoft Windows drivers are not installed. After running the utility to configure the write-verify operation, the host computer is rebooted into the Microsoft Windows operating system to resume normal operation.

Rebooting the host computer from a floppy in order to reconfigure a disk drive is undesirable since it precludes running the configuration utility from the more user friendly and familiar Microsoft Windows operating environment. In addition, it may be desirable to run the configuration utility from an Internet web page using an Internet browser program running under a Microsoft Windows operating environment. Still further, it may be desirable to reconfigure the disk drive on-the-fly relative to the type of application program running, or the type of data being manipulated. For example, it may be desirable to configure the error recovery system less stringently when storing Internet web pages in a browser's cache as opposed to storing more critical word processing or accounting documents.

There is, therefore, a need to reconfigure a disk drive in the field from a Microsoft Windows operating system without having to reboot the host computer.

SUMMARY OF THE INVENTION

The present invention may be regarded as a disk drive connectable to a host computer executing a computer program for sending a Self Monitoring Analysis and Reporting Technology (SMART) command to the disk drive. The disk drive comprises a disk, a head actuated radially over the disk, an error recovery system for detecting and correcting errors in user data read from the disk, and a cache system for caching user data received from the host computer and user data read from the disk. The disk drive further comprises a plurality of configuration parameters stored in a non-volatile manner for configuring at least one system when the disk drive is powered on, the at least one system selected from the group consisting of the cache system and the error recovery system. The disk drive comprises an interface for receiving the SMART command from the host computer. The SMART command comprises a command code comprising a predetermined value for identifying the command code as a SMART command and a sub command comprising one of a plurality of predetermine values identifying one of a plurality of SMART commands selected from the group consisting of enabling SMART diagnostics, reading diagnostic data, and transmitting setup data to the disk drive. The SMART command further comprises setup data for modifying the configuration parameters.

In one embodiment the disk drive further comprises a volatile semiconductor memory. When the disk drive is powered on, the configuration parameters are copied to the volatile semiconductor memory, and the setup data is used to modify the configuration parameters stored in the volatile semiconductor memory in order to configure the at least one system on-the-fly.

In one embodiment the error recovery system comprises a plurality of retry procedures responsive to the configuration parameters. In another embodiment, the error recovery system comprises an error correction code (ECC) system responsive to the configuration parameters. In yet another embodiment, the ECC system comprises a parity sector mode wherein the ECC system writes parity sectors to the disk, and the configuration parameters enable the parity sector mode.

In one embodiment, the disk drive comprises a write-verify system for verifying a write operation by verifying recoverability of written data, wherein the at least one system configured using the configuration parameters includes the write-verify system. In one embodiment, the configuration parameters enable the write-verify system.

In one embodiment the cache system comprises a semiconductor memory, and the cache system reserves a block of the semiconductor memory for caching data read from the disk during a read operation. The configuration parameters configure when the cache system releases the reserved block of semiconductor memory. In another embodiment, the configuration parameters configure a number of blocks reserved in the semiconductor memory for caching write data received from the host computer. In yet another embodiment, the disk comprises a plurality of tracks, where each track comprises a plurality of sectors. The configuration parameters configure a number of sectors read into the semiconductor memory during a read operation following a target sector of the read operation. In another embodiment, the configuration parameters configure a number of sectors read into the semiconductor memory during a read operation preceding a target sector of the read operation.

In one embodiment, the computer program executed by the host computer comprises a graphical user interface for generating the setup data in response to user input. In another embodiment, the computer program executed by the host computer is a user application program which generates the setup data independent of user input.

In one embodiment, the setup data is received over the Internet. An Internet web server downloads a web page to a computer connected to the disk drive. The computer displays the web page in an Internet browser program in response to user input, the web server transmits a SMART command to the disk drive via the Internet and the computer connected to the disk drive.

The present invention may also be regarded as a computer program embodied on a computer readable storage medium for use in a host computer. The computer program for configuring a disk drive by transmitting setup data in a Self Monitoring Analysis and Reporting Technology (SMART) command to the disk drive. The SMART command comprises a command code, a sub command, and a buffer. The disk drive comprises a disk, a head actuated radially over the disk, an error recovery system for detecting and correcting errors in user data read from the disk, and a cache system for caching user data received from the host computer and user data read from the disk. The disk drive further comprises a plurality of configuration parameters stored in a non-volatile manner for configuring at least one system when the disk drive is powered on, the at least one system selected from the group consisting of the cache system and the error recovery system. The computer program comprises code segments for assigning a value to the command code identifying the command code as a SMART command, assigning a value to the sub command identifying the sub command as a disk drive setup command, and assigning setup data to the buffer, the setup data for modifying the configuration parameters of the disk drive. The computer program further comprises a code segment for transmitting the SMART command to the disk drive.

BRIEF DESCRIPTION OF THE DRAWINGS

FIG. 2A shows the parameters associated with the function called from a Microsoft Windows operating system in order to invoke the SMART driver for communicating the setup data to the disk drive of FIG. 1.

FIG. 2B shows the format of a data structure used to send parameters to the disk drive using the procedure of FIG. 2A.

FIG. 2C shows the format of a data structure used to receive parameters from the disk drive using the procedure of FIG. 2A.

FIG. 2D shows the format of a data structure associated with an IDE command.

DESCRIPTION OF THE PREFERRED EMBODIMENTS

Figure 1:
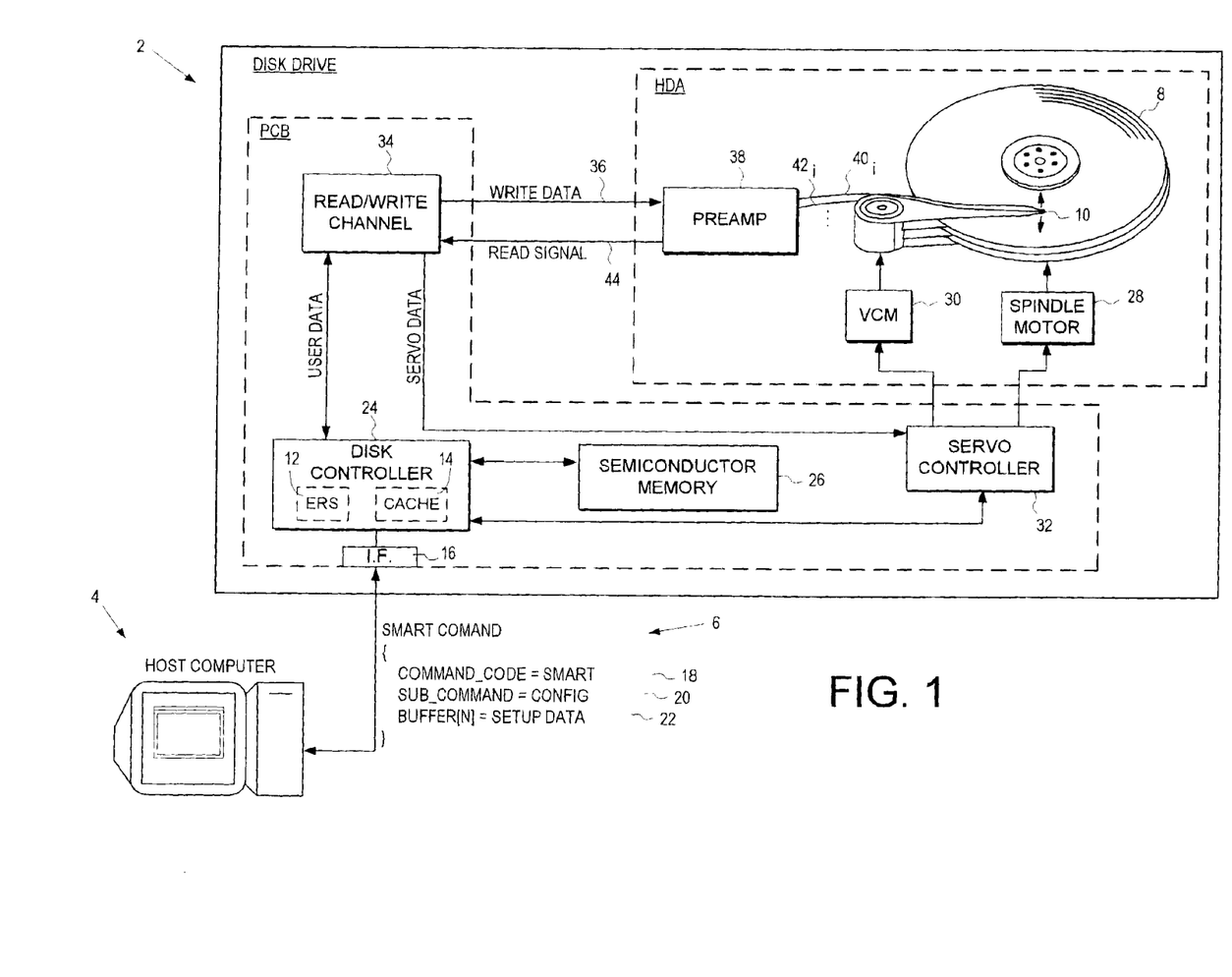
FIG. 1 shows a disk drive according to an embodiment of the present invention for receiving a SMART command from a host computer, the SMART command comprising setup data for modifying the configuration parameters of the disk drive.

FIG. 1 shows a disk drive 2 according to an embodiment of the present invention connectable to a host computer 4 executing a computer program for sending a Self Monitoring Analysis and Reporting Technology (SMART) command 6 to the disk drive 2. The disk drive 2 comprises a disk 8, a head 10 actuated radially over the disk 8, an error recovery system 12 for detecting and correcting errors in user data read from the disk 8, and a cache system 14 for caching user data received from the host computer 4 and user data read from the disk 8. The disk drive 2 further comprises a plurality of configuration parameters stored in a non-volatile manner for configuring at least one system when the disk drive 2 is powered on, the at least one system selected from the group consisting of the cache system 14 and the error recovery system 12. The disk drive 2 comprises an interface 16 for receiving the SMART command 6 from the host computer 4. The SMART 6 command comprises a command code 18 comprising a predetermined value for identifying the command code as a SMART command and a sub command 20 comprising one of a plurality of predetermine values identifying one of a plurality of SMART commands selected from the group consisting of enabling SMART diagnostics, reading diagnostic data, and transmitting setup data to the disk drive 2. The SMART command 6 further comprises setup data 22 for modifying the configuration parameters.

In the embodiment of FIG. 1 the disk drive 2 comprises a disk controller 24 for implementing the various disk drive systems, including the error recovery system 12 and the cache system 14. A semiconductor memory 26 stores the configuration parameters for access by the disk controller 24. In one embodiment, the configuration parameters are stored in a reserved sector on the disk 8. When powered on, the disk drive 2 reads the configuration parameters from the disk 8 and stores the configuration parameters in the semiconductor memory 26. In one embodiment, the setup data 22 received in the SMART command modifies both the configuration parameters stored on the disk 8 as well as the configuration parameters stored in the semiconductor memory 26 so that the disk drive 2 is configured on-the-fly.

The disk drive 2 of FIG. 1 further comprises a spindle motor 28 for rotating the disk 8 and a voice coil motor (VCM) 30 for actuating the head 10 radially over the disk 8. A servo controller 32 generates the appropriate control signals applied to the spindle motor 28 and VCM 30 in response to commands received from the disk controller 24. During a write operation the disk controller 24 transmits user data received from the host computer 4 to a read/write channel 34. The read/write channel 34 performs appropriate encoding of the user data to generate write data 36 written to the disk 8. The write data 36 modulates the operation of a preamp 38 to generate a write signal $40_i$ applied to the head 10 in order to write magnetic transitions onto the surface of the disk 8. During a read operation, the head 10 detects the magnetic transitions representing the recorded data to generate a read signal $42_i$ which is amplified by the preamp 38 to generate a read signal 44 applied to the read/write channel 34. The read/write channel 34 demodulates the read signal 44 into user data transmitted to the host computer 4 via the disk controller 24 after correcting errors using the error recovery system 12. In the embodiment of FIG. 1 embedded servo data is recorded on the disk 8, demodulated by the read/write channel 34, and used by the servo controller 32 to position the head 10 over the target data track.

The disk drive 2 communicates with the host computer 4 through a communication protocol referred to as the IDE protocol. The Microsoft Windows operating system comprises a low level "port" driver which communicates with the disk drive 2 through an IDEREGS data structure shown in FIG. 2D. There are only a limited number of IDE commands supported by disk drive manufactures as well as the Microsoft Windows operating systems. The standard IDE protocol provides no support for modifying the configuration parameters of a disk drive by a computer program running under a Microsoft Windows operating system. However, the standard IDE protocol does provide support for the Self Monitoring Analysis and Reporting Technology (SMART) which allows a computer program running under a Microsoft Windows operating system to configure a disk drive so that it will accumulate and report diagnostic information. In this manner, the host computer can evaluate the health of the disk drive and report impending failures to the user so that remedial measures can be taken before data is lost. Further details regarding the application programming interface (API) for the SMART protocol can be found in the "Windows 95 and Windows NT SMART IOCTL API Specification" version 01.02 which is incorporated herein by reference.

An IDE command of 0xB0 (inserted into the chComandReg field of the IDEREGS data structure of FIG. 2D) identifies the IDE command as a SMART command. A predetermined number of "sub commands" have been defined for the SMART protocol (inserted into the chFeaturesReg field of the IDEREGS data structure of FIG. 2D), including a sub command for enabling/disabling the SMART system within the disk drive, as well as a sub command to retrieve the diagnostic data from the disk drive. In one embodiment of the present invention, at least one of the sub commands is redefined by the disk drive 2 of FIG. 1 to allow the configuration parameters within the disk drive 2 to be modified by a computer program running under a Microsoft Windows operating system.

FIG. 2A shows the format of the function called from a computer program running under a Microsoft Operating system to effectuate the transfer of a SMART command to the disk drive 2 of FIG. 1. This function is installed into a Microsoft Windows operating system through an appropriate driver, such as the vendor specific driver DFPVSD.VXD. The function DeviceIoControl has the following input parameters:

HDevice: Identifies the device. The CreateFile function returns this handle.

DwIoControlCode: Specifies the control code for the operation. This value identifies the specific operation to be performed and the type of device on which the operation is to be performed. The following values are defined for this driver:

| Value | Meaning |
| --- | --- |
| DFP_GET_VERSION (0x00074080) | Gets the version and revision of the driver. |
| DFP_SEND_DRIVE_COMMAND (0x0007c084) | Sends a generic command to a drive. Only used to send a command to the drive that sends data or no data is transferred. |
| DFP_RECEIVE_DRIVE_DATA (0x0007c088) | Sends a command to the drive that returns data |

PvInBuffer: Points to a buffer containing the data required to perform the operation. This parameter can be NULL if the dwIoControlCode parameter specifies an operation that does not require input data.

CbInBuffer: Specifies the size, in bytes, of the lpvInBuffer buffer.

LpvOutBuffer: Points to a buffer in which the operation's output data is returned. This parameter can be NULL if the dwIoControlCode parameter specifies an operation that does not produce output data.

CbOutBuffer: Specifies the size, in bytes, of the lpvOutBuffer buffer.

LpcbBytesReturned: Points to a 32-bit variable that receives the size, in bytes, of the data returned in the lpvOutBuffer buffer.

LpoOverlapped: Points to an OVERLAPPED structure. This parameter is ignored if the hDevice handle was opened without specifying the FILE_FLAG_OVERLAPPED flag. This parameter can be NULL if overlapped operation is not desired. OVERLAPPED (asynchronous) I/O will not be used by this driver, so this parameter should be set to NULL.

Return Value: If the function succeeds, the return value is TRUE; otherwise, it is FALSE.

Before a computer program can call the DeviceIoControl function of FIG. 2A, a handle to the target driver must be obtained. An OpenSMART procedure is set forth in the attached source code appendix for obtaining a handle to the target driver. The OpenSMART procedure utilizes the CreateFile function provided by the Microsoft Windows operating system in order to create the handle to the driver. Once the handle is obtained, the target disk drive is enabled to receive SMART commands by transmitting the appropriate IDE command. A DoEnableSMART procedure is set forth in the source code appendix for enabling the disk drive to receive SMART commands.

Once the disk drive 2 has been enabled for SMART commands, the setup data for modifying the configuration parameters can be transmitted to the disk drive via a computer program running under a Microsoft Windows operating system. A DoModifyBlockKeySector is set forth in the source code appendix for transmitting the setup data to the disk drive via a SMART command. In this embodiment, the setup data is contained within a MODIFYBLOCK_KEYSECTOR data structure. The MODIFYBLOCK_KEYSECTOR data structure comprises 123 MODIFYBLOCK data structures which contain four bytes each as defined by the following table:

| Field | Bytes | Description |
| --- | --- | --- |
| Action code and Word Offset | 2 | Bits 0 to 9 - Offset from start of configuration data. For the DRAM copy, this the start of the Config. Sector memory table; for the media copy, the first entry ("serial number") after the 24-byte file header. Bits 10 to 12 - Unused (must be zero) Bits 13 to 15 - Modify action code 0 = No action, unused entry 1 = Replace LS byte 2 = Replace MS byte 3 = Replace word (LS and MS bytes) 4 = Set bit (ones in mask are set to one, zeros in mask are unchanged) 5 = Clear bit (ones in mask are set to zero, zeros in mask are unchanged) 6 to 7 = Undefined |
| LS byte | 1 | Least significant byte of data or mask |
| MS byte | 1 | Most significant byte of data or mask |

The MODIFYBLOCK data structure thus allows individual bits of the configuration parameters to be modified as well as replacing an entire byte.

A SENDCMDINPARAMS data structure shown in FIG. 2B is used to send input parameters to the disk drive 2, and a SENDCMDOUTPARAMS data structure shown in FIG. 2C is used to receive output parameters from the disk drive. The dwBufferSize field of the SENDCMDINPARAMS data structure is set to the size of the MODIFYBLOCK_KEYSECTOR data structure which is copied into the chBuffer[1] field. The irDriveRegs are configured appropriately, including to set the SMART sub command field chFeaturesReg to a value kchWriteLoggingSectorFeaturesRegister which in this embodiment is defined as 0xD6. The DeviceIoControl function of FIG. 2A is then called with the SENDCMDINARAMS data structure, including the MODIFYBLOCK_KEYSECTOR data structure which the disk drive 2 uses to modify the configuration parameters.

In one embodiment the error recovery system 12 comprises a plurality of retry procedures responsive to the configuration parameters. The computer program may configure the retry procedures in order to optimize the acceptable latency. For example, the computer program may configure the number of retries to perform before aborting a read operation.

In another embodiment, the error recovery system 12 comprises an error correction code (ECC) system responsive to the configuration parameters. The ECC system implements any suitable ECC code, such as the well known Reed-Solomon ECC code, wherein a number of redundancy bytes are generated for each data sector and stored with each data sector. The computer program may disable the retry procedures and/or the ECC code for audio/visual data in order to prevent the associated latency from interrupting the continuous transfer of a data stream.

In yet another embodiment, the ECC system comprises a parity sector mode wherein the ECC system writes parity sectors to the disk 2. A parity sector is generated by computing a parity over a predetermined number of data sectors and storing the parity sector with the data sectors. In this manner, if one of the data sectors is unrecoverable using the ECC code it can be reconstructed by combining the parity sector with the other data sectors. The computer program can enable the parity sector mode in order to increase the redundancy and associated protection for more critical data, such as accounting or word processing data.

In one embodiment, the disk drive 2 comprises a write-verify system for verifying a write operation by verifying recoverability of written data. For example, the disk drive may attempt to read a recently written data sector to verify the recoverability of the data sector before deleting the write data from the semiconductor memory 26. If the data sector is unrecoverable, the disk drive 2 may respond by rewriting the data sector, or relocating the data sector and marking the unrecoverable data sector as a defective sector. In one embodiment, the configuration parameters enable/disable the write-verify system to configure the level of protection desired relative to the associated latency.

In one embodiment the cache system 14 reserves a block of the semiconductor memory 26 for caching data read from the disk 8 during a read operation. The configuration parameters configure when the cache system 14 releases the reserved block of semiconductor memory 26. In another embodiment, the configuration parameters configure a number of blocks reserved in the semiconductor memory 26 for caching write data received from the host computer 4. In yet another embodiment, the disk 8 comprises a plurality of tracks, where each track comprises a plurality of sectors. The configuration parameters configure a number of sectors read into the semiconductor memory 26 during a read operation following a target sector of the read operation. In another embodiment, the configuration parameters configure a number of sectors read into the semiconductor memory 26 during a read operation preceding a target sector of the read operation.

In one embodiment, the host computer 4 of FIG. 1 comprises a computer readable storage medium for storing a computer program. The computer program for configuring the disk drive 2 by transmitting setup data in a Self Monitoring Analysis and Reporting Technology (SMART) command 6 to the disk drive 2. The SMART command 6 comprises a command code 18, a sub command 20, and a buffer 22. The disk drive 2 comprises a disk 8, a head 10 actuated radially over the disk 8, an error recovery system 12 for detecting and correcting errors in user data read from the disk 8, and a cache system 14 for caching user data received from the host computer 4 and user data read from the disk 8. The disk drive 2 further comprises a plurality of configuration parameters stored in a non-volatile manner for configuring at least one system when the disk drive 2 is powered on, the at least one system selected from the group consisting of the cache system 14 and the error recovery system 12. The computer program comprises code segments for assigning a value to the command code 18 identifying the command code as a SMART command, assigning a value to the sub command 20 identifying the sub command as a disk drive setup command, and assigning setup data to the buffer 22, the setup data for modifying the configuration parameters of the disk drive 2. The computer program further comprises a code segment for transmitting the SMART command 6 to the disk drive 2.

Figure 3:
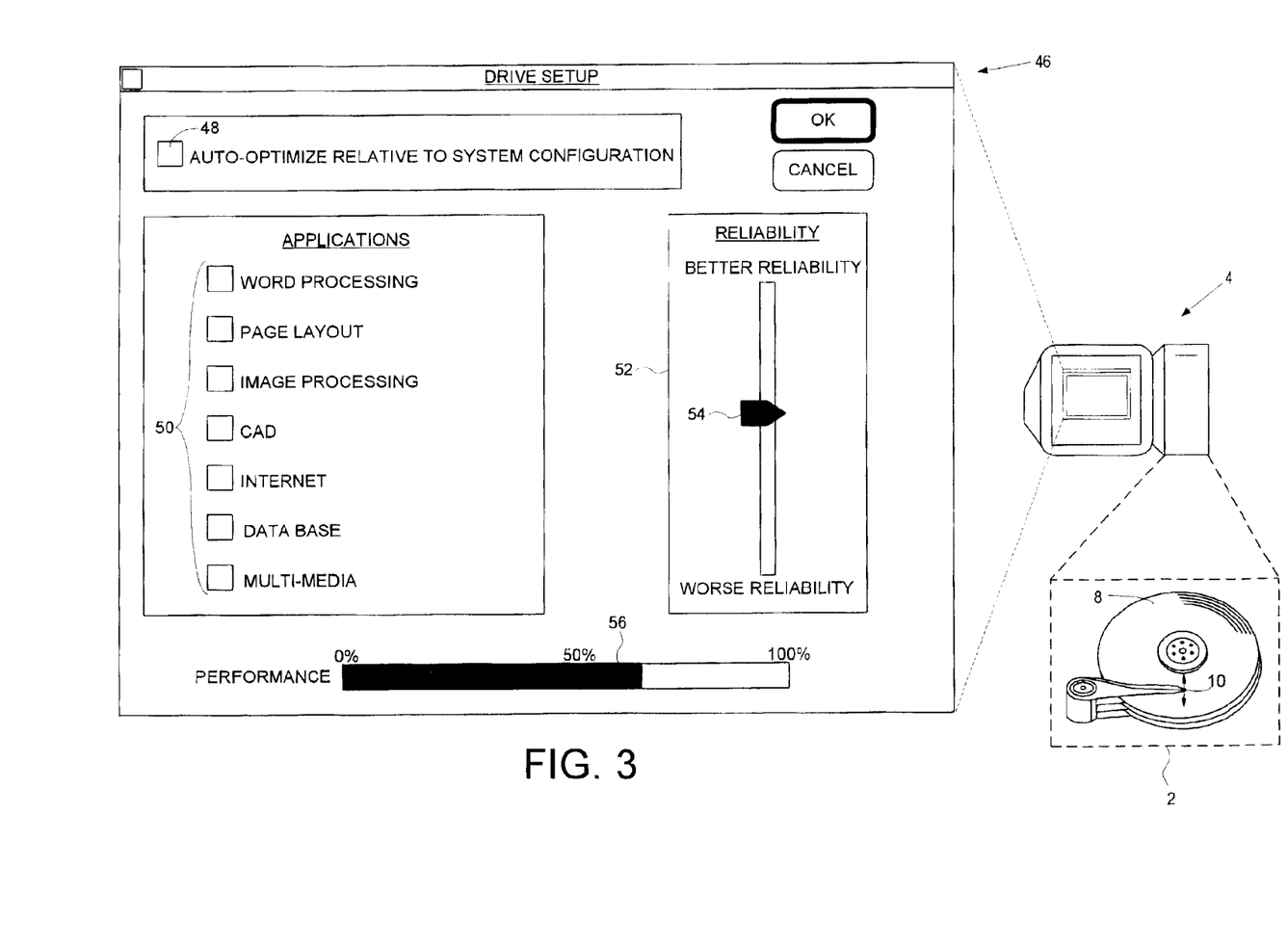
FIG. 3 shows a disk drive configuration utility executed by the host computer according to an embodiment of the present invention.

FIG. 3 shows an embodiment of the present invention wherein the computer program is a configuration utility comprising a graphical user interface for displaying a drive setup window 46. The drive setup window 46 comprises a plurality of controls manipulated by the user in order to optimize the performance of the disk drive 2. In one embodiment, the controls include a check box 48 for auto-optimizing the disk drive 2 relative to the system configuration of the host computer 4. The auto-optimize function in one embodiment scans the disk drive 2 to determine the type of applications that the user may execute and configures the disk drive 2 accordingly. For example, if the auto-optimize function only finds Internet and multi-media applications, the disk drive 2 may be configured to reduce the correction power and associated latency of the error recovery system 12. In another embodiment, the auto-optimize function may configure the cache system 14 of the disk drive 2 relative to the caching configuration of the host computer 4. For example, the host computer 4 may allocate a portion of its internal semiconductor memory for use in caching data associated with the disk drive 2. In yet another embodiment, the host computer 4 may provide error recovery functions which would allow the auto-optimize function to reduce the correction power and associated latency of the error recovery system 12 in the disk drive 2.

The controls in the embodiment of FIG. 3 further comprise a plurality of check boxes 50 associated with various types of applications, such as word processing, page layout, image processing, CAD, Internet, data base, and multi-media. The user may configure the disk drive 2 by selecting the applications that will be run on the host computer 4. For example, if the user selects audio/video applications, such as Internet and multi-media, then the configuration utility will configure the error recovery system 12 of the disk drive 2 to reduce the correction power and associated latency. If the user selects applications having more critical data, such as word processing and data base applications, the configuration utility will configure the error recovery system 12 to increase the correction power such as enabling the parity sector mode described above.

The drive setup window 46 of FIG. 3 also comprises a control 52 for manually configuring the correction power and associated latency of the error recovery system 12. The user can adjust the correction power for better or worse reliability by adjusting the tab 54 on a slide bar. The performance of the disk drive 2 decreases as the user increases the reliability and associated latency of the error recovery system 12. The drive setup window 46 comprises a bar graph 56 showing how the performance of the disk drive 2 is modified as the user manipulates the controls.

Figure 4:
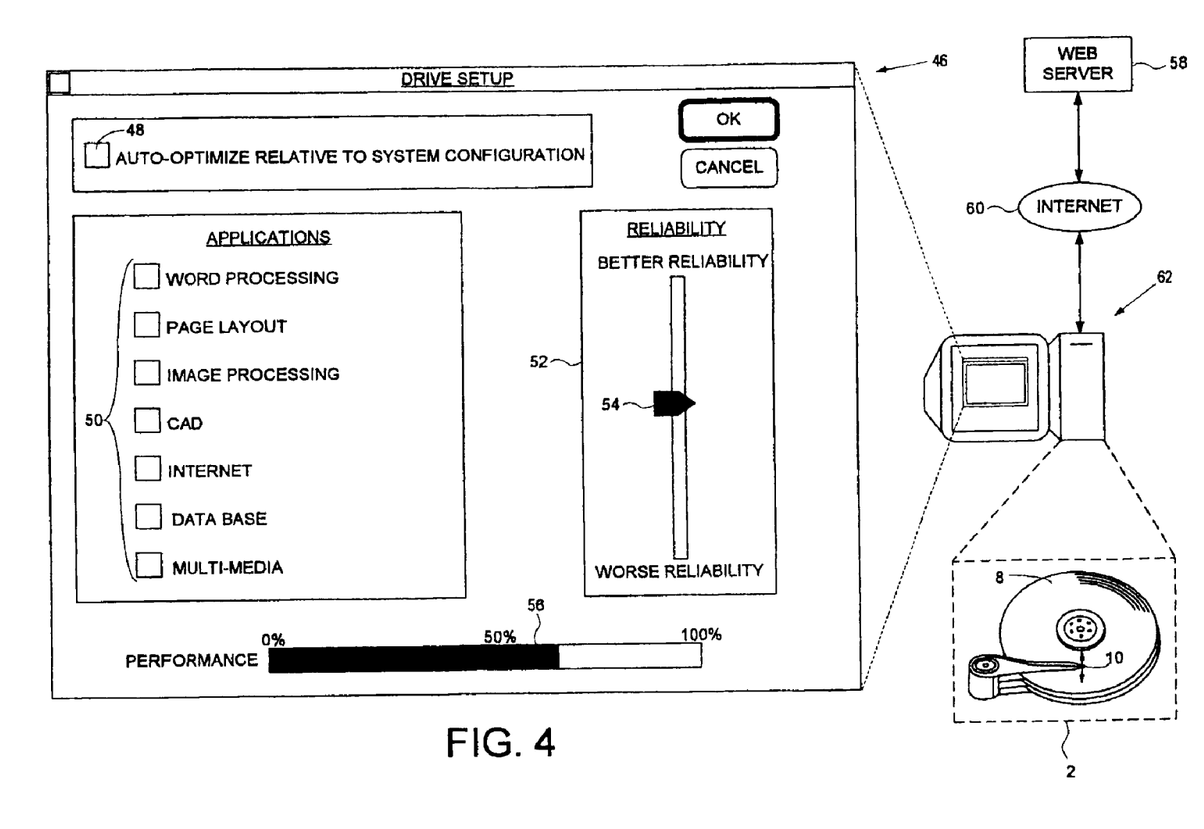
FIG. 4 shows an embodiment wherein the disk drive configuration utility is executed by a web server via the Internet.

FIG. 4 shows an alternative embodiment of the present invention wherein the host computer is an Internet web server 58 which executes the configuration utility via the Internet 60. The end user communicates with the web server 58 via an Internet browser program executed by a computer 62. A drive setup page is downloaded from the web server 58 and displayed in a drive setup window 46 of the Internet browser program. As the user manipulates the controls in the drive setup window 46, the user input is transmitted back to the web server 58 via the Internet 60. The web server evaluates the user input and generates the appropriate SMART command, including the drive setup data. The SMART command is then transmitted over the Internet 60 to computer 62 which forwards the SMART command to the disk drive 2. The web server 58 implements suitable software, such as Java scripts, to effectuate the SMART command transfer to the disk drive 2 via the Internet 60 and computer 62.

In one embodiment, the disk drive 2 is configured by a user application program running on the host computer 4. For example, a word processing or accounting program may configure the disk drive 2 to increase the correction power of the error recovery system 12. The configuration may take place when the application is launched, or the application may configure the disk drive 2 dynamically each time it performs an operation, such as a write operation. For example, each time an accounting program performs a write operation, it may first enable a parity mode of the disk drive 4 so that the data written is afforded additional protection. Once the write operation terminates, the accounting program may reconfigure the disk drive 2 to its state prior to the write operation. In this manner, each active user application program can dynamically configure the disk drive 2 to achieve the desired reliability, performance, or other configuration metric.

---

SOURCE CODE APPENDIX

```
//==================================================
// FILE:        SMARTAPI.CPP
// DESCRIPTION:     This file contains functions that allow a
//      Windows application to transfer reserved area files,
//      and modify individual bits, bytes or words within the
//      config sector. This is accomplished by utilizing the
//      DeviceIOControl windows API function that calls the
//      device driver SMARTVSD.VXD. Because there is additional
//      functionality that is not WD specific (such as executing
//      a IDENTIFY DRIVE command), there are additional functions
//      added to provide functionality for as much of what
//      SMARTVSD.VXD provides as possible
//
//
//==================================================
typedef struct_IDEREGS {
BYTE            chFeaturesReg;      // Used for specifying DFP "sub commands".
    BYTE        chSectorCountReg    // IDE sector count register
    BYTE        chSectorNumberReg   // IDE sector number register
    BYTE        chCylLowReg         // IDE low order cylinder value
    BYTE        chCylHighReg        // IDE high order cylinder value
    BYTE        chDriveHeadReg      // IDE drive/head register
    BYTE        chCommandReg;       // Actual IDE command. Checked for validity by driver.
    BYTE        chReserved;         // reserved for future use. Must be zero.
} IDEREGS. *PIDEREGS, *LPIDEREGS;
typedef struct_SENDCMDINPARAMS {
    DWORD   dwBufferSize        // Size of bBuffer in bytes
    IDEREGS irDriveRegs;        // Structure with drive register values.
    BYTE    chDriveNumber;      // Physical drive number to send command to (0,1,2,3).
    BYTE    chReserved[3];      // Reserved for future expansion.
    DWORD   dwReserved[4];      // Reserved for future expansion.
    BYTE    chBuffer[1];        // Buffer of arbitrary length in which to store the data to be written to drive.
} SENDCMDINPARAMS, *PSENDCMDINPARAMS, *LPSENDCMDINPARAMS;
typedef struct SendCmdOutParams {
    DWORD           dwBufferSize;   // Size of bBuffer in bytes
    DRIVERSTATUS    DriverStatus;   // Driver status structure.
    BYTE            chBuffer[1];    // Buffer of arbitrary length in which to store the data read from the drive.
} SENDCMDOUTPARAMS, *PSENDCMDOUTPARAMS, *LPSENDCMDOUTPARAMS;
typedef struct {
    WORD            wActionCodeAndWordOffset;
    BYTE            chLSDataByteOrMask;
    BYTE            chMSDataByteOrMask;
} MODIFY_BLOCK, *PMODIFY_BLOCK;
typedef struct {
    BYTE            chActionCode;
    BYTE            chKeyFormat;
    BYTE            chFileIDNumber;
    BYTE            chAdditionalDataSectors;
    CHAR            sSignature[12];
    WORD            wModifyBlockCount;
    MODIFY_BLOCK    aModifyBlock[123];
    CHAR            chReserved;
    BYTE            chChecksum;
} MODIFYBLOCK_KEYSECTOR, *PMODIFYBLOCK_KEYSECTOR;
// These go inside the Task File for Write and Read Logging Sector Commands
//
const BYTE kchWriteLoggingSectorFeaturesRegister = 0xD6;
const BYTE kchReadLoggingSectorFeaturesRegister = 0xD5;
const BYTE kchDoIdentifyFeaturesRegister = 0x00;
const BYTE kchAnyKeySectorSectorCountRegister = 0x01;
```

SOURCE CODE APPENDIX

```
const BYTE kchGenericSmartSectorCountRegister = 0x01;
const BYTE kchAnyKeySectorSectorNumberRegister = 0xBE;
const BYTE kchGenericSmartSectorNumberRegister = 0x01;
const BYTE kchReadOrWriteReservedArcaFileSectorNumberRegister = 0xBF;
const BYTE kchAnyLoggingSectorCylLowRegister = 0x4F;
const BYTE kchDoIdentifyCylLowRegister = 0;
const BYTE kchDoIdentifyCylHighRegister = 0;
const BYTE kchAnyLoggingSectorCylHighRegister = 0xC2;
const BYTE kchAnyLoggingSectorCommandRegister = 0xB0;
// These go inside the Key Sector Data area (512 bytes)
//
const BYTE kchTransferMode = 0x81;
const BYTE kchReadReservedKeySectorActionCode = 0x01;
const BYTE kchWriteReservedKeySectorActionCode = 0x04;
const BYTE kchModifyBlockKeySectorActionCode = 0x05;
const BYTE kchModifyBlockKeySectorKeyFormat = 0x01;
const BYTE kchModifyBlockFileIDNumber = 0x42;
const BYTE ksReadReservedFileSignature[ ] = "WDC^F$&p#\\i!"; // Note one \ is an escape for the other backslash
const BYTE ksWriteReservedFileSignature[ ] = "WDC^S#p*/i$(";
const BYTE ksModifyBlockSignature[ ] = "WDC^M)s&!U:+";
//================================================
// Name;     OpenSMART
//
// Description: This function will perform operating system dependent
//      calls that open a handle to the SMART API. This handle
//      is used by nearly every function in the file to
//      access SMART API pass-through calls. Note when the
//      caller of this function cause a handle to be opened,
//      some function on the call stack must eventually call
//      CloseHanlle.
//
//================================================
HANDLE OpenSMART(   // return the result of CreateFile
   VOID)       // VOID parameter
{
   HANDLE      hSMARTIOCTL = 0;
#ifdef WINDOWS9X
        // Version Windows 95 OSR2, Windows 98
        hSMARTIOCTL = CreateFile("\\\\.\\SMARTVSD",
                    0,
                    0,
                    0,
                    CREATE_NEW,
                    0,
                    0);
#else
        // Windows NT, Windows 2000
        hSMARTIOCTL = CreateFile("\\\\.\\PhysicalDrive0",
                    GENERIC_READ | GENERIC_WRITE,
                    FILE_SHARE_READ|FILE_SHARE_WRITE,
                    NULL,
                    OPEN_EXISTING,
                    0,
                    NULL);
#endif
        return hSMARTIOCTL;
}
//================================================
// Name:    DoEnableSMART
//
// Description: This function will enable the target drive to accept
//      SMART commands.
//
//================================================
BOOL DoEnableSMART(      // return the result of DeviceIOControl
   HANDLE hSMARTIOCTL,      // Handle returned from previous call to OpenSMART,
   PSENDCMDINPARAMS pSCIP,     // Structure that describes command details
   PSENDCMDOUTPARAMS pSCOP,     // Structure that DeviceIOControl fills with results
   BYTE chDriveNum,       // DriveNum = 0 through 3
   PDWORD pdwBytesReturned)  // Number of Bytes Returned From DeviceIOControl
{
   BOOL bRetVal = TRUE; // assume success for case where DO_IO_CONTROL is not defined
   //
   // Set up data structures for Enable SMART Command.
   //
   pSCIP->dwBufferSize = 0.
   pSCIP->irDriveRegs.chFeaturesReg = SMART_ENABLE_SMART_OPERATIONS;
```

SOURCE CODE APPENDIX

```
  pSCIP->irDriveRegs.chSectorCountReg = kchGenericSmartSectorCountRegister;
  pSCIP->irDriveRegs.chSectorNumberReg = kchGenericSmartSectorNumberRegister;
  pSCIP->irDriveRegs.chCylLowReg = kchAnyLoggingSectorCylLowRegister;
  pSCIP->irDriveRegs.chCylHighReg = kchAnyLoggingSectorCylHighRegister;
  //
  // Compute the drive number.
  //
  pSCIP->irDriveRegs.chDriveHeadReg = kchAnyLoggingSectorDriveHeadObsoleteBits | ((chDriveNum & 1) << 4);
  pSCIP->irDriveRegs.chCommandReg = kchAnyLoggingSectorCommandRegister;
  PSCIP->chDriveNumber = chDriveNum;
  #if defined(DO_IO_CONTROL)
     bRetVal = (DeviceIoControl(hSMARTIOCTL, DFP_SEND_DRIVE_COMMAND,
         (LPVOID)pSCIP, sizeof(SENDCMDINPARAMS) - 1,
         (LYVOID)pSCOP, sizeof(SENDCMDOUTPARAMS) - 1,
         pdwBytesReturned, NULL) );
  #endif
  return bRetVal;
}
//================================================
// Name:     DoModifyBlockKeySector
//
// Description: This function writes a sector that allows you to set
//       the value of a byte, word, or bit in the config
//       sector. You can specify 123 such "modifications"
//       by setting up Modify Block data within the key sector.
//       Note that you cannot change the first 24
//       bytes of the config sector with this command. Also
//       note that although there are components of the
//       SMART firmware that support two sectors of modify
//       block data, WD Firmware Engineering (see Mark Vallis)
//       has determined that we only need to implement one
//       sectors worth of modify block data.
//       This function performs the write
//       by calling the DeviceIOControl function that in turn
//       calls the SMARTVSD.VXD (or equivalent) driver. The
//       key sector data that is written in a buffer that is
//       part of the PSENDCMDINPARAMS structure. As a result,
//       the data MUST be adjacent in memory with the
//       rest of the PSENDCMDINPARAMS structure. Note that
//       the caller of this function MUST allocate extra space
//       for the data written in the PSENDCMDINPARAMS
//       structure before calling this function.
//================================================
BOOL DoModifyBlockKeySector(          // return the result of DeviceIOControl
    HANDLE hSMARTIOCTL,               // Handle returned from previous call to OpenSMART
    PSENDCMDINPARAMS pSCIP,           // Structure that describes command details (including task file input AND output)
    PSENDCMDOUTPARAMS pSCOP,          // Structure that DeviceIOControl fills with results, also contains read buffer
    BYTE chDriveNum,                  // DriveNum = 0 through 3
    PMODIFY_BLOCK pModifyBlock,       // Array of MODIFY_BLOCK structs that the key sector will be filled with
    WORD wNumModifyBlocks,            // Number of Valid MODIFY_BLOCKS in the previous parameter
    PDWORD pdwBytesReturned)          // Number of Bytes Returned From DeviceIOControl
{
BOOL bRetVal = 1;
// Note: The first backslash if for the escape character on ksReadReservedFileSignature
//
// Point to the KeySector part of the KeyCmd
//
MODIFYBLOCK_KEYSECTOR   KeySector,
memset((void*) &KeySector, 0, sizeof(KeySector));
//
// Set up data structures for DFP_SEND_DRIVE_COMMAND command.
//
pSCIP->dwBufferSize = kwKEY_SECTOR_BUFFER_SIZE; // - sizeof(SENDCMDINPARAMS) + 1;
// Note that when DeviceIOControl has returned these input paramters are
// filled with output values from the drive.
//
pSCIP->irDriveRegs.chFeaturesReg = kchWriteLoggingSectorFeaturesRegister;
pSCIP->irDriveRegs.chSectorCountReg = kchAnyKeySectorSectorCountRegister;
pSCIP->irDriveRegs.chSectorNumberReg = kchAnyKeySectorSectorNumberRegister,
pSCIP->irDriveRegs.chCylLowReg = kchAnyLoggingSectorCylLowRegister;
pSCIP->irDriveRegs.chCylHighReg = kchAnyLoggingSectorCylHighRegister;
pSCIP->irDriveRegs.chDriveHeadReg = kchAnyLoggingSectorDriveHeadObsoleteBits | ((chDriveNum & 1) << 4);
pSCIP->irDriveRegs.chCommandReg = kchAnyLoggingSectorCommandRegister;
pSCIP->chDriveNumber = chDriveNum;
KeySector.chActionCode = kchModifyBlockKeySectorActionCode;
KeySector.chKeyFormat = kchModifyBlockKeySectorKeyFormat;
KeySector.chFileIDNumber = kchModifyBlockFileIDNumber;
```

-continued

SOURCE CODE APPENDIX

```
memcpy(KeySector.sSignature, ksModifyBlockSignature, 12);
KeySector.chAdditionalDataSectors = 0;
KeySector.wModifyBlockCount = wNumModifyBlocks;
// Copy the ModifyBlock data into the KeySector
//
memcpy(KeySector.aModifyBlock, pModifyBlock, wNumModifyBlocks * sizeof(MODIFY_BLOCK));
// Copy the KeySector into the packet buffer
//
memcpy(pSCIP->chBuffer, &KeySector, kwKEY_SECTOR_BUFFER_SIZE);
memset(pSCOP, 0x00, sizeof(SENDCMDOUTPARAMS));
#if defined(DO_IO_CONTROL)
    bRetVal = (DeviceIoControl(hSMARTIOCTL, DFP_SEND_DRIVE_COMMAND,
        (LPVOID)pSCIP, sizeof(SENDCMDINPARAMS) + kwKEY_SECTOR_BUFFER_SIZE - 1,
            (LPVOID)pSCOP, sizeof(SENDCMDOUTPARAMS) - 1,
            pdwBytesReturned, NULL) );
#endif
    return bRetVal;
}
```

I claim:

1. A disk drive connectable to a host computer executing a computer program for sending a Self Monitoring Analysis and Reporting Technology (SMART) command to the disk drive, the disk drive comprising:

(a) a disk;

(b) a head actuated radially over the disk;

(c) an error recovery system for detecting and correcting errors in user data read from the disk;

(d) a cache system for caching user data received from the host computer and user data read from the disk;

(e) a plurality of configuration parameters stored in a non-volatile manner for configuring at least one system when the disk drive is powered on, the at least one system selected from the group consisting of the cache system and the error recovery system; and (f) an interface for receiving the SMART command from the host computer, the SMART command comprising:

a command code comprising a predetermined value for identifying the command code as a SMART command;

a sub command comprising one of a plurality of predetermine values identifying one of a plurality of SMART commands selected from the group consisting of enabling SMART diagnostics, reading diagnostic data, and transmitting setup data to the disk drive; and setup data for modifying the configuration parameters.

2. The disk drive as recited in claim 1, wherein:

(a) the disk drive further comprises a volatile semiconductor memory;

(b) when the disk drive is powered on, the configuration parameters are copied to the volatile semiconductor memory; and (c) the setup data for modifying the configuration parameters stored in the volatile semiconductor memory for configuring the at least one system on-the-fly.

3. The disk drive as recited in claim 1, wherein the error recovery system comprises a plurality of retry procedures responsive to the configuration parameters.

4. The disk drive as recited in claim 1, wherein the error recovery system comprises an error correction code (ECC) system responsive to the configuration parameters.

5. The disk drive as recited in claim 4, wherein:

(a) the ECC system comprises a parity sector mode wherein the ECC system writes parity sectors to the disk; and (b) the configuration parameters enable the parity sector mode.

6. The disk drive as recited in claim 1, further comprising a write-verify system for verifying a write operation by verifying recoverability of written data, wherein the at least one system configured using the configuration parameters includes the write-verify system.

7. The disk drive as recited in claim 6, wherein the configuration parameters enable the write-verify system.

8. The disk drive as recited in claim 1, wherein:

(a) the cache system comprises a semiconductor memory;

(b) the cache system reserves a block of the semiconductor memory for caching data read from the disk during a read operation; and (c) the configuration parameters for configuring when the cache system releases the reserved block of semiconductor memory.

9. The disk drive as recited in claim 1, wherein:

(a) the cache system comprises a semiconductor memory; and (b) the configuration parameters for configuring a number of blocks reserved in the semiconductor memory for caching write data received from the host computer.

10. The disk drive as recited in claim 1, wherein:

(a) the cache system comprises a semiconductor memory;

(b) the disk comprises a plurality of tracks, (c) each track comprises a plurality of sectors; and (d) the configuration parameters for configuring a number of sectors read into the semiconductor memory during a read operation following a target sector of the read operation.

11. The disk drive as recited in claim 1, wherein:

(a) the cache system comprises a semiconductor memory;

(b) the disk comprises a plurality of tracks;

(c) each track comprises a plurality of sectors; and (d) the configuration parameters for configuring a number of sectors read into the semiconductor memory during a read operation preceding a target sector of the read operation.

12. The disk drive as recited in claim 1, wherein the computer program comprises a graphical user interface for generating the setup data in response to user input.

13. The disk drive as recited in claim 1, wherein:

(a) the computer program executed by the host computer is a user application program; and (b) the user application program generates the setup data independent of user input.

14. The disk drive as recited in claim 1, wherein the setup data is received over the Internet.

15. A computer program embodied on a computer readable storage medium for use in a host computer, the computer program for configuring a disk drive by transmitting setup data in a Self Monitoring Analysis and Reporting Technology (SMART) command to the disk drive, the SMART command comprising a command code, a sub command, and a buffer, the disk drive comprising a disk, a head actuated radially over the disk, an error recovery system for detecting and correcting errors in user data read from the disk, and a cache system for caching user data received from the host computer and user data read from the disk, the disk drive further comprising a plurality of configuration parameters stored in a non-volatile manner for configuring at least one system when the disk drive is powered on, the at least one system selected from the group consisting of the cache system and the error recovery system, the computer program comprising code segments for:

(a) assigning a value to the command code identifying the command code as a SMART command;

(b) assigning a value to the sub command identifying the sub command as a disk drive setup command;

(c) assigning setup data to the buffer, the setup data for modifying the configuration parameters of the disk drive and (d) transmitting the SMART command to the disk drive.

16. The computer program as recited in claim 15, wherein:

(a) the disk drive further comprises a volatile semiconductor memory;

(b) when the disk drive is powered on, the configuration parameters are copied to the volatile semiconductor memory; and (c) the setup data for modifying the configuration parameters stored in the volatile semiconductor memory for configuring the at least one system on-the-fly.

17. The computer program as recited in claim 15, wherein the error recovery system comprises a plurality of retry procedures responsive to the configuration parameters.

18. The computer program as recited in claim 15, wherein the error recovery system comprises an error correction code (ECC) system responsive to the configuration parameters.

19. The computer program as recited in claim 18, wherein:

(a) the ECC system comprises a parity sector mode wherein the ECC system writes parity sectors to the disk; and (b) the configuration parameters enable the parity sector mode.

20. The computer program as recited in claim 15, wherein the disk drive further comprises a write-verify system for verifying a write operation by verifying recoverability of written data, wherein the at least one system configured using the configuration parameters includes the write-verify system.

21. The computer program as recited in claim 20, wherein the configuration parameters enable the write-verify system.

22. The computer program as recited in claim 15, wherein:

(a) the cache system comprises a semiconductor memory;

(b) the cache system reserves a block of the semiconductor memory for caching data read from the disk during a read operation; and (c) the configuration parameters for configuring when the cache system releases the reserved block of semiconductor memory.

23. The computer program as recited in claim 15, wherein:

(a) the cache system comprises a semiconductor memory; and (b) the configuration parameters for configuring a number of blocks reserved in the semiconductor memory for caching write data received from the host computer.

24. The computer program as recited in claim 15, wherein:

(a) the cache system comprises a semiconductor memory;

(b) the disk comprises a plurality of tracks;

(c) each track comprises a plurality of sectors; and (d) the configuration parameters for configuring a number of sectors read into the semiconductor memory during a read operation following a target sector of the read operation.

25. The computer program as recited in claim 15, wherein:

(a) the cache system comprises a semiconductor memory;

(b) the disk comprises a plurality of tracks;

(c) each track comprises a plurality of sectors; and (d) the configuration parameters for configuring a number of sectors read into the semiconductor memory during a read operation preceding a target sector of the read operation.

26. The computer program as recited in claim 15, further comprising a code segment for implementing a graphical user interface, the graphical user interface for generating the setup data in response to user input.

27. The computer program as recited in claim 15, further comprising a code segment for generating the setup data independent of user input.

28. The computer program as recited in claim 15, where in the setup data is transmitted over the Internet.

* * * * *